(12) United States Patent
McCubbrey

(10) Patent No.: US 7,073,158 B2
(45) Date of Patent: Jul. 4, 2006

(54) AUTOMATED SYSTEM FOR DESIGNING AND DEVELOPING FIELD PROGRAMMABLE GATE ARRAYS

(75) Inventor: David L. McCubbrey, Ann Arbor, MI (US)

(73) Assignee: Pixel Velocity, Inc., Ann Arbor, MI (US)

( * ) Notice: Subject to any disclaimer, the term of this patent is extended or adjusted under 35 U.S.C. 154(b) by 416 days.

(21) Appl. No.: 10/441,581

(22) Filed: May 19, 2003

(65) Prior Publication Data

US 2004/0060032 A1    Mar. 25, 2004

Related U.S. Application Data

(60) Provisional application No. 60/381,295, filed on May 17, 2002.

(51) Int. Cl.
*G06F 17/50* (2006.01)
(52) U.S. Cl. ........................... 716/17; 716/18
(58) Field of Classification Search ............... 716/16, 716/17, 1, 18
See application file for complete search history.

(56) References Cited

U.S. PATENT DOCUMENTS

| | | | |
|---|---|---|---|
| 5,452,239 A * | 9/1995 | Dai et al. ..................... 703/19 |
| 6,086,629 A | 7/2000 | McGettigan et al. |
| 6,301,695 B1 | 10/2001 | Burnham et al. |
| 6,370,677 B1 | 4/2002 | Carruthers et al. |
| 6,457,164 B1 | 9/2002 | Hwang et al. |
| 6,526,563 B1 | 2/2003 | Baxter |
| 6,557,156 B1 | 4/2003 | Guccione |
| 6,754,882 B1 * | 6/2004 | Sanchez et al. ............... 716/16 |
| 2003/0086300 A1 | 5/2003 | Noyes et al. |

* cited by examiner

*Primary Examiner*—Thuan Do
(74) *Attorney, Agent, or Firm*—Jeffrey Schox

(57) ABSTRACT

An automated system and method for programming field programmable gate arrays (FPGAs) is disclosed for implementing user-defined algorithms specified in a high level language. The system is particularly suited for use with image processing algorithms and can speed up the process of implementing and testing a fully written high-level user-defined algorithm to a matter of a few minutes, rather than the days, weeks or even months presently required using conventional software tools. The automated system includes an analyzer module and a mapper module. The analyzer determines what logic components are required and their interrelationships, and observes the relative timing between the required components and their partial products. It also ascertains when signal delays are required between selected components. The mapper module utilizes the output from the analyzer module and determines where the required logic components must be placed on a given target FPGA in order to reliably route, without interference, the required interconnections between various components and I/O. The mapper includes means for evaluating alternative interconnection routes between logic components within the target FPGA, and means for producing an optimized placement and routing of the logic components and interconnections on the target FPGA. The mapper also generates a low level command listing as a source file that serves as an input file for a conventional low-level FPGA programming tool. From that input file, the tool is able to generate a hardware gate-programming bitstream to be directed to the target FPGA, thereby programming the FPGA with the user-defined algorithm.

20 Claims, 13 Drawing Sheets

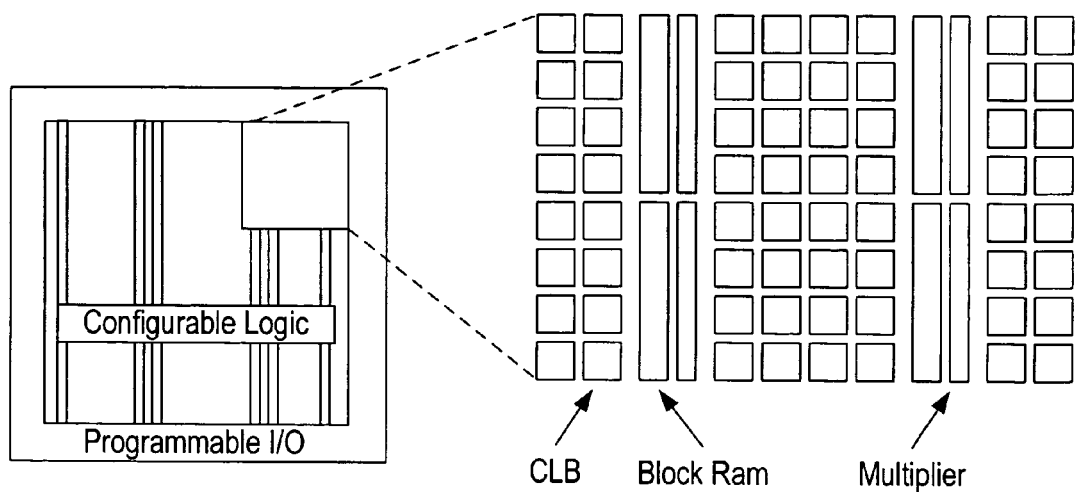
FIG. 2
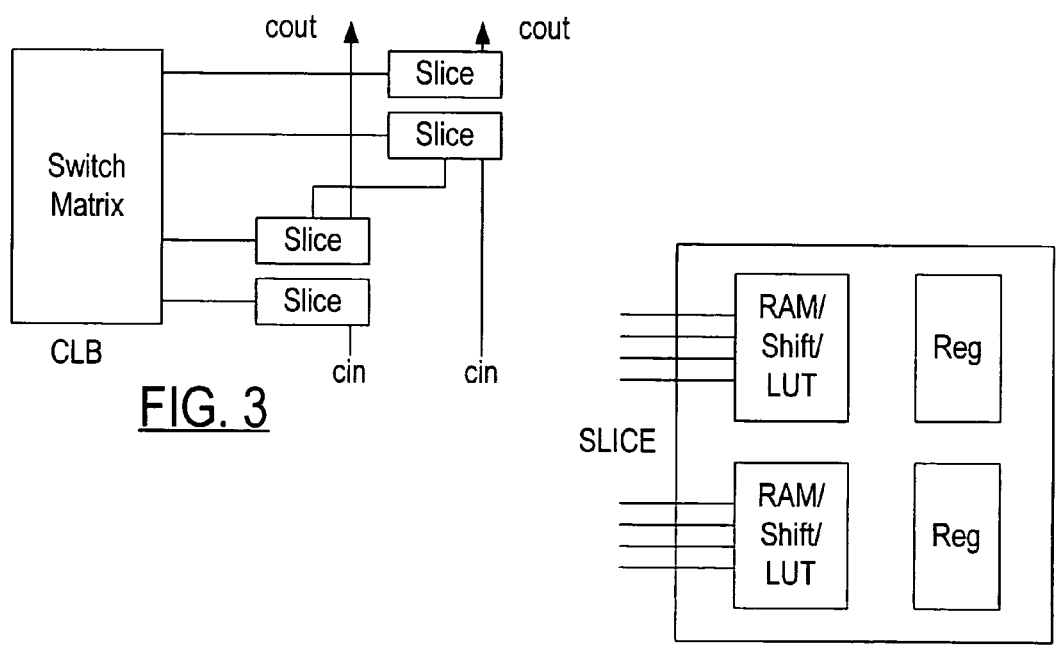
FIG. 3
FIG. 4

Edge = DCyl(snsr,2) - ECyl(snsr,2); Out = edge - snsr

AUTOMATED SYSTEM FOR DESIGNING AND DEVELOPING FIELD PROGRAMMABLE GATE ARRAYS

CROSS-REFERENCE TO RELATED APPLICATION

This application claims priority to U.S. provisional patent application Ser. No. 60/381,295 filed May 17, 2002 by the same inventor and entitled "Automated System for Designing and Developing Field Programmable Gate Arrays", the entire specification of which is incorporated herein by reference.

BACKGROUND OF THE INVENTION

1. Field of the Invention

This invention relates in general to systems and methods for designing, developing and programming field programmable gate arrays (FPGAs), and in particular to automated systems and methods for designing, developing and programming FPGAs to implement a user-written algorithm specified in a high-level language for processing data vectors with one, two or more dimensions, such as often are found in image processing and other computationally intense applications.

2. Discussion

There are known benefits of using FPGAs for embedded machine vision or other image processing applications. These include processing image data at high frame rates, converting and mapping the data and performing image segmentation functions that were all previously handled by dedicated, proprietary processors. FPGAs are well-known for having a much greater power to process images, on the order of 10 to 100 times that of conventional advanced microprocessors of comparable size. This is in part a function of the fully programmed FPGA being set up as a dedicated circuit designed to perform specific tasks and essentially nothing else.

Another benefit of FPGAs is their low power consumption and low weight. FPGAs are very suitable for embedded avionic applications, in-the-field mobile vision applications and severe-duty applications, such as mobile vehicles, including those which are off-road, where severe bumps and jolts are commonplace. These applications are very demanding in that they have severe space, weight, and power constraints. Modern FPGAs now have the processing capacity on a par with dedicated application-specific integrated circuits (ASICs), and are or can be made very rugged.

FPGAs have grown in popularity because they can be programmed to implement particular logic operations and reprogrammed easily as opposed to an application specific integrated circuit (hereafter ASIC) where the functionality is fixed in silicon. But this very generic nature of FPGAs, deliberately made so they can be used in many different applications, is also a drawback due to the many difficulties associated with efficiently and quickly taking a high level design specified by a user, and translating it into a practical hardware design that meets all applicable timing, floor plan and power requirements so that it will run successfully upon the target FPGA. As is well-known, a high level user-generated design is typically specified by a sequence of matrix array or mathematic operations, including local pixel neighborhood operations (such as erosion, dilation, edge detection, determination of medial axis, etc.) and other forms of arithmetic or Boolean operations (e.g., addition, multiplication; accumulation; exclusive-OR, etc.), lookup table and shift register functions, and other functions like convolution, autocorrelation, and the like. In order to be able to handle all of this diverse logic, the individual logic blocks used in the FPGAs are made to be fairly generic.

The problem in supporting all these applications and functions is how to design reconfigurable hardware resources that provide the most effective use of general purpose FPGA silicon for the specific image processing tasks to which a given FPGA is put to use. FPGAs are by their very nature general purpose circuits that can be programmed to perform many different functions, such as digital signal processing used in wireless communication, encryption and decryption for communications over the Internet, etc.

One expected benefit of FPGAs, since they are reprogrammable, is that they would help eliminate the cost/risk of ASIC development. One of the few things really holding back the larger use of FPGAs in vision applications has been the difficulty in translating desired user-defined image processing algorithms into hardware, and the difficulty of updating those algorithms once they are in hardware. If there were a development system for the design and programming of FPGAs that greatly simplified the development of an image processing algorithm or other sequence of desired operations into the bitstream coding required to program FPGAs, this might well open up opportunities for wider use of FPGAs in such applications as medical, automotive collision avoidance and commercial video.

For example, in the medical area, many medical imaging techniques have extremely high processing requirements. FPGAs, assuming that they can be programmed with the desired sequence of complex image processing steps, should produce smaller, faster and less expensive versions of existing image processing devices that presently require ASIC devices be developed. In addition, many new applications will become possible for the first time, because FPGAs can give speedups of one, two and even three orders of magnitude over PCs, at a reasonable price. Automotive vision applications that are on the horizon include proposals to help enhance driver situational awareness. Possible automotive vision applications include systems to assist with lane-changes, to provide backup obstacle warnings, and to provide forward collision warnings.

Commercial video FPGAs, if they were much easier to design, program and test, would likely find much wider use in video transcoders, compression, encryption and standards support, particularly in areas like MPEG-4. Many video applications are already being done with FPGAs, but the design, development and testing of such FPGAs is at present very labor-intensive in terms of designer and engineering services, which drives up unit costs and slows down the transfer of proposed designs into actual commercial embodiments.

SUMMARY OF THE INVENTION

In light of the foregoing limitations and needs, the present invention provides an FPGA-based image processing platform architecture that is capable dramatically speeding up the development of user-defined algorithms, such as those found in imaging applications. As a convenient shorthand reference, since the present invention is assigned to Pixel Velocity, Inc. of Ann Arbor, Mich. ("PVI"), the system of the present invention will at times be referred to as the PVI system, and the methods of the present invention discussed therein will at times be referred to as the PVI methods.

Generally, the present invention pertains to an automated system for programming field programmable gate arrays (FPGAs) to implement a desired algorithm for processing data vectors with one, two or more of the dimensions. The PVI system automates the process of determining what logic components are necessary and produces an optimized placement and routing of the logic on the FPGA. With this invention, FPGA programming development work that used to take weeks or months, in terms of trying to implement and test a previously-created user-defined algorithm, such as a sequence of steps to be carried out as part of an image processing application in a machine vision system, can now be completed in less than one day.

As is well-known, Verilog and VHDL are languages for describing hardware structures in development systems for writing and programming FPGAs. In the methods and systems of the present invention, Verilog is used to develop what PVI refers to as "gateware" which provides specific hardware-level interfaces to things like image sensors and other I/O. The end user evokes this functionality in much the way predefined library functions are used in software today. The PVI system focuses solely on the image processing domain. At the application level, a user's image processing algorithm is developed and verified in C++ on a PC. An image class library and overloaded operators are preferably provided as part of the PVI system of the present invention to give users a way of expressing algorithms at a high level. The PVI system uses that high level representation to infer a "correct-by-construction" FPGA hardware image dataflow processor automatically.

In the method and systems of the present invention, the dedicated image processor is derived from the user's source code and merged with prebuilt "gateware" automatically, as part of the process of producing one or more low-level files that may be referred to as hardware-gate-programming files (or HGP files for short) for programming the FPGA(s) using known low-level software tools available from each FPGA manufacturer. The user thus ends up with a machine that powers up and runs their algorithm on a continuous stream of images. A key advantage is that algorithm developers can write and verify algorithms in a familiar and appropriate way, then produce a "push-button" dedicated machine in only minutes, fabricated to do just that algorithm. In other words, the PVI system of the present invention analyzes the imaging algorithm code specified by the end user, that is the algorithm developer, and, by applying a sequence of steps, which are further described below, generates a hardware-gate-programming file composed entirely of conventional commands and instructions that can be interpreted by low-level FPGA programming tools to produce bitstreams. These HGP files are used as a low-level input file containing the code that specifies, to conventional low-level programming (LLP) software tools available from the FPGA manufacturer (that is, the bitstream generators used to hard code the FPGAs), the required connections to be programmed into the target FPGA. These LLP software tools are capable of reading and acting upon the commands represented by the HGP files in order to field-program the FPGA using conventional techniques. The method and systems of the present invention are preferably arranged to automatically apply, upon user command, the HGP file output they produce to these LLP software tools, thus completing the programming of the FPGA in a fully automatic manner.

BRIEF DESCRIPTION OF THE DRAWINGS

The drawings form an integral part of the description of the preferred embodiments and are to be read in conjunction therewith. Like reference numerals designate the same or similar components or features in the various Figures, where:

FIGS. 2, 3 and 4 are further simplified the block diagrams illustrating a known style of FPGA, where FIG. 2 shows the overall layout of the FPGA, and also shows one of its specific sections enlarged to reveal the arrangement details of CLBs, block RAM and multiplier logic therein, FIG. 3 is an enlargement of a single CLB unit showing its switch matrix and its associated slices, which contain still further units of configurable logic therein, and FIG. 4 is a enlarged view of one of the slices, showing its RAM, registers, shift registers and lookup tables, all of which are programmable.

DETAILED DESCRIPTION OF THE PREFERRED EMBODIMENTS

The present invention is illustrated and described herein in connection with preferred embodiments, with the understanding that the present disclosure is to be considered as an exemplification of the principles of the invention and the associated functional specifications required for its implementation. However, it should be appreciated that the systems and methods of the present invention may be implemented in still different configurations and forms, and that other variations within the scope of the present invention are possible based on the teachings herein.

Prior to discussing the embodiments of the present invention, it is useful to look more closely at some of the known characteristics of existing design, development and programming systems used to provide hardware programming bitstreams to program FPGAs. Typically, such design and development systems are implemented on workstations operating under any suitable operating system, such as UNIX, Windows, Macintosh or Linux. Such development systems typically will have suitable applications software such as ISE development system from Xilinx, and C++ or Java programming compilers, to allow programs written by users to run thereon.

Due to advancing semiconductor processing technology, integrated circuits have greatly increased in functionality and complexity. For example, programmable devices such as field programmable gate arrays (FPGAs) and programmable logic devices (PLDs), can incorporate ever-increasing numbers of functional blocks and more flexible interconnect structures to provide greater functionality and flexibility.

A typical FPGA comprises a large plurality of configurable logic blocks (CLBs) surrounded by input-output blocks and interconnectable through a routing structure. The first FPGA is described in U.S. reissue patent Re No. 34,363 to Freeman, and is incorporated herein by reference. The CLBs and routing structure of the FPGA are arranged in an array or in a plurality of sub-arrays wherein respective CLBs and associated portions of the routing structure are placed edge to edge in what is commonly referred to as a tiled arrangement. Such a tiled arrangement is described in U.S. Pat. No. 5,682,107 to Tavana et al., the disclosure of which is hereby incorporated by reference herein. The CLB portion of a tile comprises a plurality of primitive cells which may be interconnected in a variety of ways to perform a desired logic function. For example, a CLB may comprise a plurality of lookup tables (LUTs), multiplexers and registers. As used herein, the term "primitive cell" normally means the lowest level of user accessible component.

Figure 1:
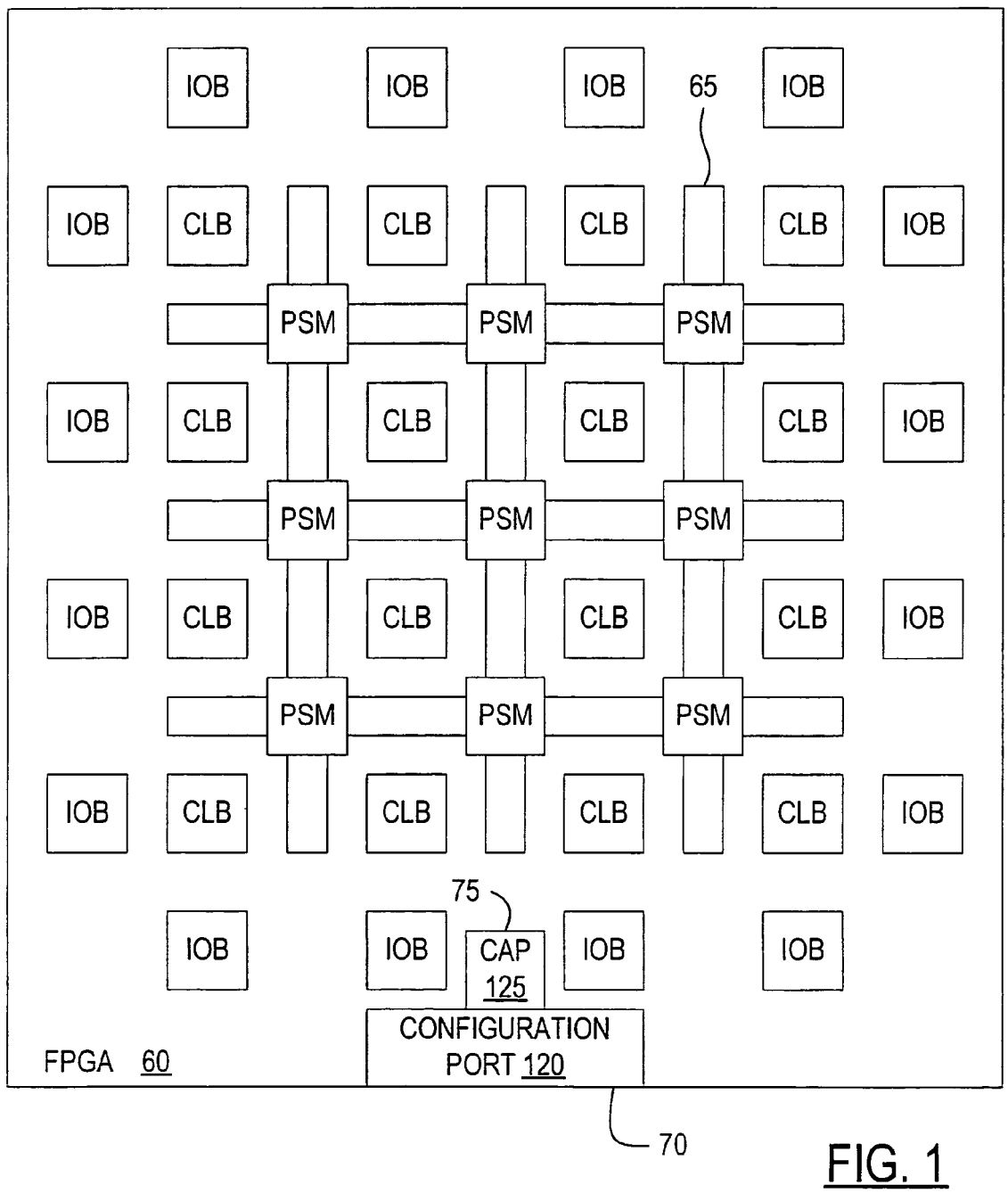
FIG. 1 is a simplified block diagram of a known FPGA.

FIG. 1 is a simplified schematic diagram of a conventional FPGA 60. FPGA 60 includes user logic circuits such as input/output blocks (IOBs), configurable logic blocks (CLBs), and programmable interconnect 65, which contains programmable switch matrices (PSMs). Each IOB and CLB can be configured through configuration port 70 to perform a variety of functions. Programmable interconnect 65 can be configured to provide electrical connections between the various CLBs and IOBs by configuring the PSMs and other programmable interconnection points (PIPS, not shown) through configuration port 70. Typically, the IOBs can be configured to drive output signals or to receive input signals from various pins (not shown) of FPGA 60.

FPGA 60 also includes dedicated internal logic. Dedicated internal logic performs specific functions and can only be minimally configured by a user. For example, configuration port 70 is one example of dedicated internal logic. Other examples may include dedicated clock nets (not shown), power distribution grids (not shown), and boundary scan logic (i.e. IEEE Boundary Scan Standard 1149.1, not shown).

FPGA 60 is illustrated with 16 CLBS, 16 IOBs, and 9 PSMs for clarity only. Actual FPGAs may contain thousands of CLBS, thousands of IOBs, and thousands of PSMs. The ratio of the number of CLBs, IOBs, and PSMs can also vary.

FPGA 60 also includes dedicated configuration logic circuits to program the user logic circuits. Specifically, each CLB, IOB, PSM, and PIP contains a configuration memory (not shown) which must be configured before each CLB, IOB, PSM, or PIP can perform a specified function. Typically the configuration memories within an FPGA use static random access memory (SRAM) cells. The configuration memories of FPGA 60 are connected by a configuration structure (not shown) to configuration port 70 through a configuration access port (CAP) 75. A configuration port (a set of pins used during the configuration process) provides an interface for external configuration devices to program the FPGA. The configuration memories are typically arranged in rows and columns. The columns are loaded from a frame register which is in turn sequentially loaded from one or more sequential bitstreams. (The frame register is part of the configuration structure referenced above.) In FPGA 60, configuration access port 75 is essentially a bus access point that provides access from configuration port 70 to the configuration structure of FPGA 60.

FIG. 1A illustrates a conventional method used to configure FPGA 60. Specifically, FPGA 60 is coupled to a configuration device 230 such as a serial programmable read only memory (SPROM), an electrically programmable read only memory (EPROM), or a microprocessor. Configuration port 70 receives configuration data, usually in the form of a configuration bitstream, from configuration device 230. Typically, configuration port 70 contains a set of mode p pins, a clock pin and a configuration data input pin. Configuration data from configuration device 230 is transferred serially to FPGA 60 through the configuration data input pin. In some embodiments of FPGA 60, configuration port 70 comprises a set of configuration data input pins to increase the data transfer rate between configuration device 230 and FPGA 60 by transferring data in parallel. However, due to the limited number of dedicated function pins available on an FPGA, configuration port 70 usually has no more than eight configuration data input pins. Further, some FPGAs allow configuration through a boundary scan chain. Specific examples for configuring various FPGAs can be found on pages 4–46 to 4–59 of "The Programmable Logic Data Book", published in January, 1998 by Xilinx, Inc., and available from Xilinx, Inc., 2100 Logic Drive, San Jose, Calif. 95124, which pages are incorporated herein by reference. Additional methods to program FPGAs are described by in U.S. Pat. No. 6,028,445 to Lawman issued Feb. 22, 2000, assigned to Xilinx, Inc. and entitled "Decoder Structure and Method for FPGA Configuration," the disclosure of which is hereby incorporated by reference herein.

U.S. Pat. No. 6,086,629 to McGettigan et al. issued Jul. 11, 2000, is entitled "Method for Design Implementation of Routing in an FPGA Using Placement Directives Such as Local Outputs and Virtual Buffers" (the '629 patent), and is assigned to Xilinx, Inc. As explained therein, when an FPGA comprises thousands of CLBs in large arrays of tiles, the task of establishing the required multitude of interconnections between primitive cells inside a CLB and between the CLBs becomes so onerous that it requires software tool implementation. Accordingly, the manufacturers of FPGAs including Xilinx, Inc., have developed place and route software tools which may be used by their customers to implement their respective designs. Place and route tools not only provide the means of implementing users' designs, but can also provide an accurate and final analysis of static timing and dynamic power consumption for an implemented design scheme. In fact, better place and route software provides iterative processes to minimize timing and power consumption as a final design implementation is approached. Iterative steps are usually necessary to reach a final design primarily because of the unknown impact of the placement step on routing resources (wires and connectors) available to interconnect the logic of a user's design. Iterative place and route procedures can be time consuming. A typical design implementation procedure can take many hours of computer time using conventional place and route software tools. Thus, as previously noted, there is an ongoing need to provide a method for reducing design implementation time by increasing the accuracy of static timing and dynamic power analysis during computer-aided design procedures for FPGAs. The '629 patent addresses these issues of accuracy of static timing and dynamic power analyses. However, it does not provide a streamlined method for translating user-created algorithms into bitstreams.

The '629 patent also discusses the challenge presented to software tools used to place a user's design into a coarse-grained FPGA is to make optimum use of the features other than lookup tables and registers that are available in the FPGA architecture. These can include fast carry chains, XOR gates for generating sums, multiplexers for generating five-input functions, and possibly other features available in the architecture. In order to achieve maximum density and maximum performance of user logic in an FPGA, the software must make use of these dedicated features where possible. The '629 patent also states that there is a need to densely pack the user's design into the architecture that will implement the design.

The '629 patent also discusses that it is well-known to specify or provide library elements which reflect features of the FPGA architecture in the typical development system provided to end-users. Several architectural features and associated timing and power parameters can be represented by variable parameters for one library element. For example, a lookup table library element has one variation in which the lookup table output signal is applied to a routing line external to the configurable logic block (CLB), and another variation in which the lookup table output signal is applied to another internal element of the CLB such as a five-input function multiplexer or a carry chain control input. These two variations have different timing parameters associated with them because the time delay for driving an element internal to the CLB is less than the time delay for driving an interconnect line external to the CLB.

If the FPGA user is using VHDL or schematic capture for design entry, the VHDL or schematic capture design entry tool will auto-select the library elements, but the user must still control the design entry tool so it selects and connects the library elements properly. Alternatively, the user may design at a higher level using macros that incorporate the library elements. These macros will have been properly developed to make good use of the architectural features of the FPGA.

The methods disclosed in the '629 patent are said to result in placement directives for carrying out subsequent place and route algorithms. The placement directives can, for example, limit relative placement of two elements of a user's design. One such directive specifies a "local output" (LO) of some of the primitive library elements, which implies that particular output must be connected to another primitive library element input within the local CLB.

Another kind of directive provided in the method of the '629 patent uses virtual buffer library elements to represent architectural features other than architectural elements. These library elements are referred to as virtual buffers because they serve only a design function and corresponding buffers do not actually exist in a CLB. A virtual buffer may be used to specify special dedicated routing that may exist in the FPGA interconnect architecture. For example, a fast feedback line may be represented as a virtual buffer with an associated fast timing parameter. A constraint to keep certain gates of a user's design within the same row or column may be specified by a virtual buffer. The virtual buffers can provide placement and routing directives such as to connect a primitive library element output to another CLB input Within some prescribed geographical limit such as within 4 or 6 CLBs of the originating CLB.

Using local outputs (LO) and virtual buffers provides a vehicle for feeding connection constraints to place and route tools so that interconnections can be designed by the provided software tools, but within user-selected limit criteria. The primitive element library provides more accurate timing and power parameters than did prior art software tools, which in turn reduces the required number of iterations and thus the time required to complete a design.

The '629 patent to McGettigan et al addressed the aforementioned needs by providing a method of evaluating a customer's design for implementing in coarse grain FPGAs. Steps in the method included; (1) forming and employing a library of selected primitive library elements, (2) defining the connection classes representative of connections in an FPGA that will implement the design, (3) assigning appropriate connection classes to the inputs and outputs of the respective primitive library elements, and (4) attaching timing and power parameters to each library element. In this manner, the primitive library elements and defined interconnections used by the library elements have accurately established timing and power parameters, thereby enabling more accurate assessments of static timing and power consumption for the entire FPGA design prior to running the place and route software. Whereas the placement and routing of a user's design may take hours, the evaluation of the static timing and dynamic power analysis of a prospective FPGA design and for passing desired placement and routing information to known FPGA place and route tools may take only minutes, according to this patent. The '629 patent provides an approach for achieving these objectives, and is useful to show the state-of-the-art, and thus the disclosure of '629 patent is hereby incorporated herein by reference. However, the '629 patent does not teach or suggest the systems and methods of the present invention.

As explained above, actual FPGAs can have thousands of CLBs, IOBs, PSMs, and PIPs; therefore, the design and development of FPGA software is very time-consuming and expensive. The development and implementation phase of transferring a high-level user-specified algorithm to a FPGA is considered by many to be difficult at best. Accordingly, there been a number of the towns, including the use of automated place and route software, designed to make this process easier. In addition, given the very tedious nature of designing logical components at the gate level, many vendors provide macros for automating the development or implementation of specific functions that can be incorporated by an end user of the FPGA into the user's own design file. For example, Xilinx, Inc. provides a PCI interface macro, which can be incorporated by an end user into the user's design file. The user benefits from macro because the user does not need to spend the time or resources to develop the macro. The vendor strives to provide macros which have high performance, flexibility, and yield a low gate count for maximum FPGA density. U.S. Pat. No. 6,301,695 to Burnham et al. issued Oct. 9, 2001 and assigned to Xilinx, Inc. and entitled "Methods to Securely Configure an FPGA Using Macro Markers," which discloses a system and method to protect such macros against unlicensed use, talks about the advantages of macros in some detail. Accordingly, the disclosure of that patent is hereby incorporated by reference herein since summarizes shows some of the efforts made within the field to render the design and implementation stays of FPGA use more efficient. But the '695 patent does not teach or suggest the systems and methods of the present invention.

Figure 5:
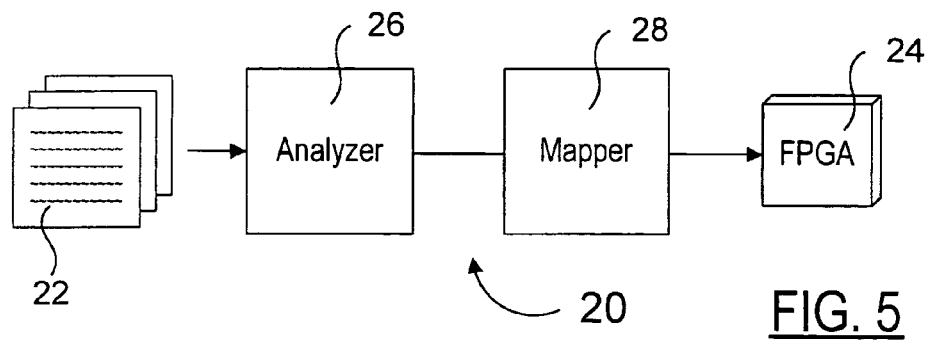
FIG. 5 is a simplified block diagram showing the sequence of operations used by the system and methods of the present invention, starting with a user-defined algorithm on the left, whose content is entered into an analyzer module, whose output in turn is entered into a mapper module, whose output is a low level source code that can be used to program an FPGA.

FIG. 5 schematically illustrates a system 20 designed according to this invention for automatically converting from a source code 22 to a field programmable gate array 24. The source code 22 describes the intended operation of the eventual FPGA 24. The inventive arrangement includes an analyzer module and a mapper module 28 that automatically analyze the source code 22 and provide a mapping and arrangement of the necessary components to be implemented on the FPGA 24.

The analyzer module 26 in one example uses standard compiler technology to parse the language of the source code 22. In most situations, the source code 22 will be in a high-level language such as C++ which is capable of specifying parallelism at the source code level through object types. Of course, this invention is not limited to any particular computer language used to develop the source code 22. The analyzer module 26 processes the source code 22 to identify vector elements within the source code and to provide a dataflow graph that indicates the overall vector processing flow and operation sequence within the source code 22. (The dataflow graph is a specific implementation of the user-specified functions listed in the syntax tree associated with the high-level language in which the user writes his or her algorithms.) In one example, the analyzer module identifies all operators and vector operands within the source code 22. The analyzer module 26 then uses the identified operators and vector operands to determine the order and dependencies of the procedures or operations are required by the source code 22.

Once the order and dependencies of the source code 22 are determined by the analyzer module 26 that information is provided to the mapper module 28. In one example, a mapper module 28 comprises software that automatically generates a mapping of the necessary gates or logic components onto the FPGA 24 to accomplish the functions required by the source code 22. The information provided by the mapper module 28 can be utilized with conventional field programmable gate array manufacturing processes.

The analyzer module 26 and mapper module 28 preferably operate given a selected overall vector processing architecture for the FPGA 24. A variety of vector processing architectures are known for handling information such as digital images. In the digital image processing field, example architectures include a parallel array processor, a raster sub-array processor, a pipeline raster sub-array processor and a multi-pipeline raster sub-array processor. In one example implementation of this invention, a user of the system performs some preliminary analysis of target application constraints 22 to make a determination of which architecture will be chosen to guide the mapper module 28 at automatically developing and arranging the logic components for the FPGA 24.

Figure 6:
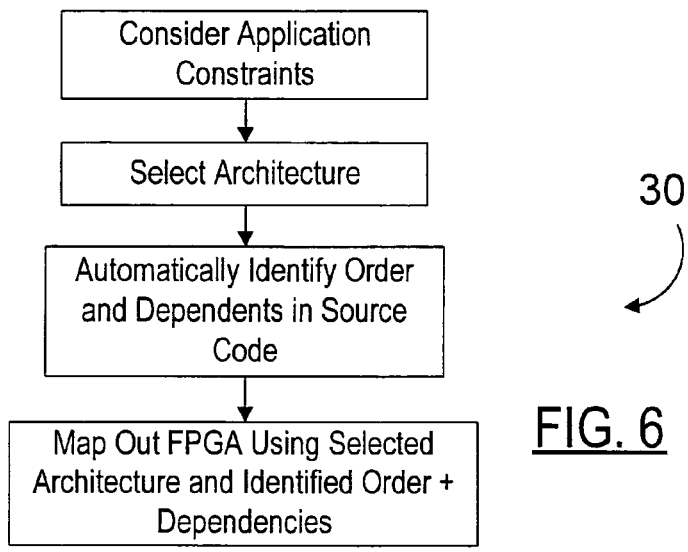
FIG. 6 is a flowchart illustrating the overall method of the present invention.

A method of using this invention is summarized in the flowchart of FIG. 6.

FIGS. 2, 3, 4 and 8 schematically illustrate an example FPGA 24, which includes a plurality of configurable logic blocks 34, RAM memory portions 36, and multiplier portions 38. Such components are well-known. The arrangement or sequence of the operations performed by the logic blocks 34 is determined by the mapping module according to the dataflow graph. Each of the elements on the FPGA is designed to accomplish the necessary logical functions or operations on the information at the appropriate point during the flow of 42.

This automatically generated layout and routing arrangement provides significant advantages in rendering the FPGA more readily reprogrammable to accomplish a greater variety of functions through the re-use of selected portions of the FPGA 24 (partial reconfiguration) as needed for a particular algorithm. Additionally, using the generally serpentine flow path 42 simplifies and economizes the connections needed between the various configurable logic blocks 34. Accordingly, this invention provides a more economical use of the resources available on and FPGA substrate. A final advantage of this method is that it is more economical than the programmable vector processing architectures previously mentioned, because only the operations called out by the algorithm source code are actually instantiated in the FPGA.

Figure 9:
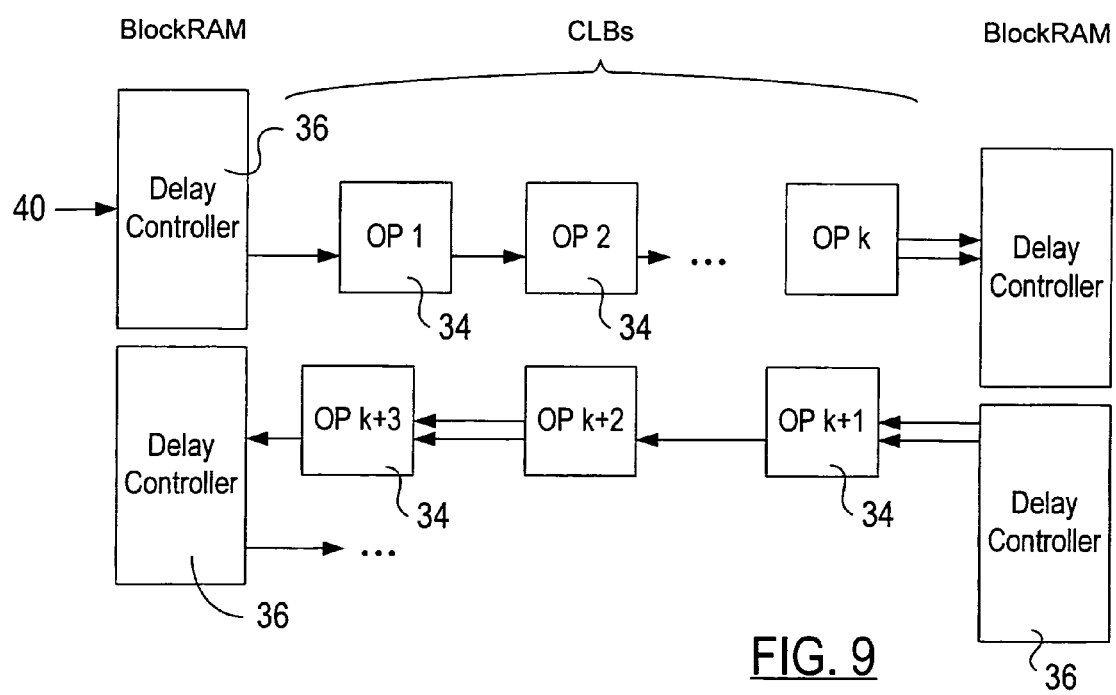
FIG. 9 is a more detailed view of the simplified layout of FIG. 8 showing how the individual operations of the user-defined sequence may be mapped onto CLBs typically between two separate sections of RAM which are used as delay lines in order to ensure that proper timing is maintained between partial products of the image processing sequence.

FIG. 9 schematically illustrates one example implementation of this invention where the generally serpentine flow 42 is schematically illustrated across a plurality of operators 34, each of which is arranged on one of the configurable logic blocks. The particular example of FIG. 9 schematically illustrates an example implementation of this invention where a multi-pipeline raster sub-array processor architecture was selected and then automatically implemented using the analyzer module 26 and mapper module 28.

Figure 7:
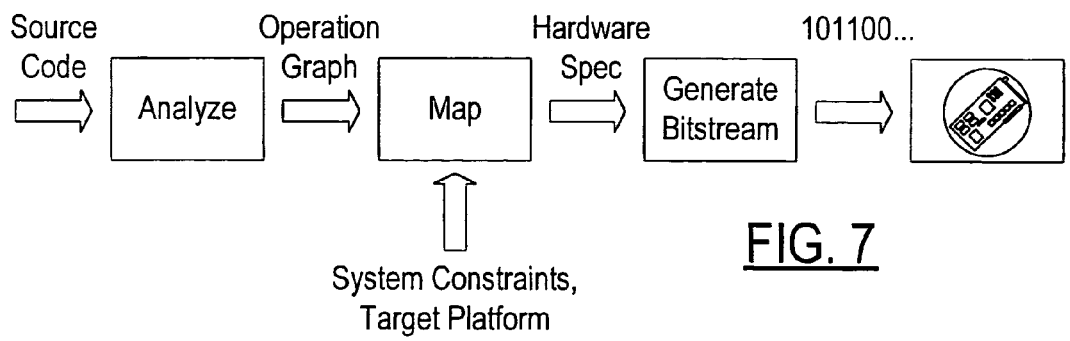
FIG. 7 is another simplified by block diagram like that shown in FIG. 5 which represents the major steps utilized in methods of the present invention.
Figure 8:
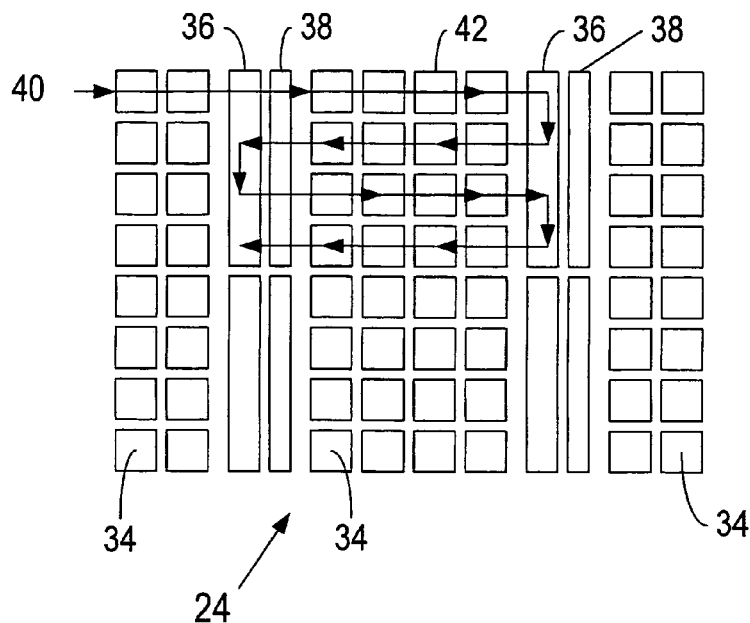
FIG. 8 is a simplified layout showing a preferred serpentine arrangement for a succession of image processing operations which have been mapped onto a portion of the overall FPGA shown in FIG. 2.

FIG. 7 lays out in a global fashion the overall aspects or steps in the process of taking a user's design for a particular image processing job which needs to be performed, which consists of a variety of separate image functions, and takes that resulting source code prepared by the user and from it automatically generates the necessary bit stream in order to program a desired or target field programmable gate array (FPGA) board. In order to do this, the user must first write an image processing job or program consisting of a variety of image processing functions, all of which are well known. To accomplish this Step 1, the user writes an algorithm specifying the desired image processing operations to be performed, which have been selected by a user from referring to a suitable image class library of functions, such as the PVI image class functions. The image class libraries implement standard functions, including Boolean functions and neighborhood morphological functions and various gray scale functions and binary functions. The processing steps of those functions form no part of this invention in that they are well-known to many in the digital image analysis industries. Preferably, the user writes his program in C++ or some other source code which the software of the invention can understand and analyze. This takes us to Step 2 which will now be described.

Step 2 consists of a program of the invention which automatically analyzes the runtime behavior of the user's program in order to produce an operation data flow graph. In other words, this analyzer will construct a sequence and timing diagram known in the art as an operation data flow graph from which all necessary image processing and mathematical operations can be readily identified and extracted. This run time behavior data is collected and along with the operation data flow graph is then presented to the mapper, which is used in Step 3.

Step 3 consists of the mapper program which takes the desired image processing operations specified in the user program and maps them into suitable hardware structures which can be used by the target FPGA and its bit stream software to generate the programed FPGA. Among other things, the mapper will look for timing delays and other kinds of problems or limitations which constrain which kind of hardware structures may be utilized to implement the operations. These will be described in detail later.

Step 4 is the generation of a bit stream for the FPGA, which works as follows. The system of the present invention feeds the output of the mapper to a conventional bit stream generator, which as is well-known, takes a low-level source or input file containing configuration, routing and location as its input and generates therefrom a machine-language binary output or bitstream used to program the target FPGA. In other words, all necessary connections which must be programmed into the FPGA in order to implement the user-designed or user-selected algorithm are provided in the specifications found in the low-level output of the mapper module which may be conveniently stored in a single file. In a presently preferred system of the present invention, the output of the mapper module is low-level user-readable source code of the type normally provided to a conventional bit stream generator. Accordingly, and should be readily understood, the bitstream generator uses the output file the mapper in a conventional way that need not be further described in any further detail herein.

The mapper has a variety of inputs. These include system constraints, which basically means how fast the image processing system must run in real-time to analyze the image stream in a timely manner, and a target platform constraint, which references the specific FPGA that will be utilized as well as some secondary issues such as I/O performance associated with that FPGA. In addition, there is an architectural platform constraint which refers to the specific setup and limitations of the various hardware (circuitry) components which are provided on the printed circuit board that the FPGA is mounted on. In the present situation, this printed circuit board (PCB) or card is provided by Pixel Velocity and represents normal design specifications, for the most part with respect to tying into and using a FPGA.

In the simplest case, the target platform and the architectural platform refer to a single FPGA and a single PCB. In practice, particularly with more complicated image processing sequences which are to be put into a hardware form using FPGAs, multiple cards in a stack may be utilized, with each card having a FPGA in it. (This is part of the PVI invention.)

One of the interesting aspects of the present invention is that is normally very difficult and tricky to partition FPGAs an image processing sequence across multiple cards. Only someone with a great deal of experience normally is able to make reasonably good design choices with very few iterations in order to implement a multiple FPGA image processing system. The present invention helps solve that problem, even in the multiple FPGA image processing domain, by automating the partitioning process.

Preferably, the software package of the present invention includes a certain sets of rules or constraints for selecting suitable layouts when certain types of logic components are specified by the user. In this regard, it is well-known that various digital imaging functions, arithmetic functions, and Boolean functions, when implemented in a specific architecture, and/or when specified with a certain number of inputs, outputs and/or partial products will predictably require certain amounts of available floor space for internal use and for expected interconnections. In other words, for each class of logic components and for each size of logic component within that class, there are well-known sets of rules which dictate the minimum required floor space that it is considered safe to provide for connecting such logic components to other logic components and/or to known input or output connection points on a target FPGA for a given style of architecture.

All routing and placement programs used in FPGA development and programming systems employ such sets of rules. At times, the rules are dictated by obvious hard constraints, and sometimes they are dictated by the practical experience and/or testing and/or simulations of those involved in the FPGA design and development field, particularly those who evaluate the efficacy of and problems occasionally encountered or associated with known placement and routing programs and procedures. In any event, when a given logic component is utilized, the mapper module of the present invention not only knows its actual size, but it also is able to make use of the sets of rules associated with specific logic components and specific input and output connections to determine how much for space should be reserved in each direction around the component for the inputs and outputs of the component. Such data may be known from lookup tables relating to pre-specified (that is, pre-designed) layouts and designs for a given logic component. Such data may also be determined, in a well-known manner, using parametric tools that scale up or down the size of exemplary logic components based upon, for example, the number of bits or lines being processed simultaneously. These kinds of sets of rules relating to floor space and preferred layouts and designs for logic components are well-known and need not be further described here.

In general, given the current technical constraints dictated by hardware circuitry considerations, 32 bit integers are the maximum size presently handled. Clearly a 64 bit architecture could be utilized for the system of present invention but it would be much more expensive to implement.

The elaboration process includes selecting from the user specified design, which has been broken down into its various logical or image operations suitable hardware components for each image operator. The selection of the image operator will be customized based upon both the throughput requirement and the number of bits per pixel, that is the number of bits being processed per pixel. So, if the cycle clock is slow enough, it is possible to subdivide that cycle clock perhaps into 9 or 12 subdivisions and perform on the PVI platform a sequence of separate operations, one occurring during each subdivision. For example, a known 3×3 neighborhood process (such as an erosion) may require 9 or 10 clock subdivisions in order to produce one operational result. However, if the pixel clock is faster such that only 3 subdivisions are possible, then this 3×3 neighborhood process which requires 9 subdivisions will have to be separated out into three sections and separated out into three sections and spread out in the design space so that these sets of those operations can be performed in parallel. This will require use of more hardware components (floor space) in order to realize the implementation of this operator within one pixel clock cycle. In the exemplary embodiments of the PVI system and method of the present invention, the most area-efficient alternative is chosen automatically. This of course results in maximum utilization of the available components and available interconnections within the target FPGA.

The system of the present invention at the present time preferably is implemented largely or entirely software and operates as an efficient and reliable compiler of user-specified algorithms. One of the benefits of the system of the present invention is that it can select where practical, pre-designed blocks of hardware components that already have been tested and proven reliable through use in other designs and/or through benchmark testing or simulation studies. At other times, particularly given the image pixel size, it may be necessary to parametrically generate a specific hardware block such as from a particular design that is scalable, to perform to a specific operator for given number of inputs, outputs, partial-products or cross-products. The system of the present invention can readily be arranged to accommodate both the pre-specified and/or pre-programmed components and the parametrically-scaled components. With regard to the parametrically generated blocks, the easiest to implement are the logical or arithmetic operators, since these can be readily expanded or scaled up or down in a known fashion to handle a larger or smaller pixel size. Since there are numerous teachings available to those skilled in the art with regard to the specific designs for virtually any given logic function or logic component, and for the parametric scaling of logic functions and logic components, these subjects need not be discussed further here.

With regard to the use of hardware blocks, all blocks used by the present invention have a preplanned structure and a local routing specification provided therewith, in order to ensure that the hardware components selected for each operation can be appropriately wired together. One of the important aspects of this invention is the use of local routing specifications where possible or practical to ensure that the wiring between the various hardware components takes place if possible on a single FPGA rather than requiring wiring runs through connection or routing means to a second or subsequent FPGA. This reduces the wiring requirements. In other words, in a multiple FPGA environment, the system of the present invention makes intelligent choices to put as much of the wiring between blocks as possible on a given FPGA so that the wiring routes can be implemented in a known manner by FPGA programming, rather than dedicating hardwired connections between onboard chips on the same PCB or even between the different PCBs within a stack.

The foregoing discussion really is applicable to the local routing specification within the FPGA. In particular, Xilinx provides a switch matrix and a configurable logic block in multiple pairs on a typical FPGA chip which it makes. The Xilinx software will provide automatic routing, if you tell it what logic operations to implement. Unfortunately, left to its own devices, this automatic routing capability provided by the Xilinx local routing compiler does not provide optimal routing and often uses up valuable real estate on the FPGA. So, as part of the PVI compiler, the local routing between the switch matrix and its associated CLB is specified completely. In this fashion, the PVI compiler knows what real estate has been used up and can, more importantly, plan for efficient utilization of available logic functions and switching functions within each FPGA.

One benefit of using pre-designed blocks which PVI has prepared for the more common operators is that they use a known amount of real estate on the switch matrix and within the CLB. As importantly, the unused connections are also known, and thus can be used for the interconnection of various hardware components implementing different operators. Accordingly, the PVI pre-designed operator block (implemented as selected hardware components) uses a known amount of real estate, and leaves identifiable route or gate connections available for interconnecting the different operators which have been laid out onto a given FPGA floor plan space.

In other words, the FPGA floor plan space is a blank space for implementing any desired floor plan. The PVI compiler takes known operators and places them in desirable locations within this floor plan, with a view toward leaving sufficient available unused routes to serve as the wiring connections to interconnect these hardware blocks which have been used to implement the known operators. The reason the PVI compiler works well is that none of this routing is left to chance. The Xilinx place and route software will take operations and automatically write code to implement the connections. However, the specific choices of connector routes used is fully automated and quite unpredictable in advance. This often results in situations where connections cannot be made from point A to point B because the connection space had already been crisscrossed one or more times by the wiring choices made by the Xilinx compiler to carry out an earlier operation. The PVI compiler avoids this problem by judiciously laying out the various hardware components which implement the desired operators with enough space in between so as to ensure that any necessary connections, which may be one bit wide or n bits wide as needed, can be accommodated between the hardware components on a given FPGA. If the PVI compiler recognizes that there will be connection problems, it tosses out that particular floor plan in favor of a more distributed floor plan which provides enough room in between the pre-designed blocks in order to connect the blocks.

The Mapper Overview. The discussion above in part is performed by the mapper. As noted on this next slide, the mapper elaborates the abstract flow graph operations into the physical operator blocks. The second step of this process is to determine the hardware block placement that best minimizes the floor plan area on the FPGA while maintaining the needed routability, and while using limited wiring path lengths to guarantee that timing requirements will be met. As noted earlier, it may be necessary to introduce certain additional delays in order to ensure that the resulting partial image product arrives at the right place with the other partial image products in order to carry out parallel operations. The hardware block placement algorithm presently is implemented by laying out parallel processes in a serpentine fashion across the available floor plan area of a Xilinx FPGA. Space is left for expected routing connections which are needed to take the resultant partial product and bring it to proper common areas with other partial products. This so-called proper common area is defined by the connection requirements for the inputs to next hardware block in the sequence of desired image processing operators. There are well-known programs used in LSI and VLSI compilers for making available floor space be densely utilized while leaving suitable space for expected inter-connections between hardware blocks. One such algorithm would start with a variety of different approaches and map each one out, and then look at which one resulted in the densest floor space and select that one as the best fit. The system of the present invention may use this or any other known technique for the selection of the placement of hardware blocks and wiring connections therebetween in order to select the desired floor plan or design to be burned into the FPGA at programming time.

One of the benefits of the present invention is that the mapping of the specific components required to implement an operator are taken care of first. These hardware components are placed on the available real estate first, with each one being a unified block which need not be and preferably is not entered by other connectors. In other words, those hardware components associated with a pre-designed image processing operator only need have inputs and outputs connected to it. Accordingly, in a given image processing situation, once the hardware components for the different operations have been laid out, all that is left is to connect the input and outputs from the different blocks. In a typical reasonable complex image processing sequence, there may be 50 or 60 hardware components which need to be connected. But this is a much smaller task than connecting tens of thousands of separate gates, which the typical Xilinx local routing compiler attempts to do. In this manner, all field routing on the FPGA is constrained in an organized manner, first within given hardware operators; second, within a string of sequential image processing steps or operations; third, between sequences of concurrent or parallel image processing streams (i.e., partial products) which are to be presented simultaneously and at the proper time to a subsequent hardware operator; and fourth, to system's inputs and outputs, which are provided for in pre-specified locations. This rigorous approach may have some built-in space utilization inefficiencies associated with it. However, it has three distinct benefits. The first is that hardware blocks which are known to work flawlessly (that is without glitches and without suspect timing issues) are utilized. The second is that the sequential subsections are also put together in a simple usually serpentine fashion, and also work flawlessly.

Third, and most importantly, the remaining interconnections which need to be made yield or devolve into a much simpler set of resulting connections that need to be made amongst the strings of sequential operator blocks and overall system inputs and outputs. Using any number of well-known connection software algorithms, or simply trying all available combinations for different floor plans, the best floor plan can be determined. By best floor plan it is meant the floor plan which implements all required image processing operations of the users specified job, while leaving the most available real estate open for still further connections which can be made if necessary. In this manner, the PVI compiler optimizes real estate at the operations level and generally succeeds in utilizing space relatively effectively. This is not to say that a human being using traditional tools who spent months and months trying to optimize space would not come up with a more elegant architecture with less wasted space. However, the design tradeoff here is deemed well worth it: the typical 2 or 3 man months required to optimize all of the required connections is now reduced down to a few moments or minutes processing, i.e., on the order of 2 seconds for simpler operations to a few minutes for more complex operations.

Figure 10:
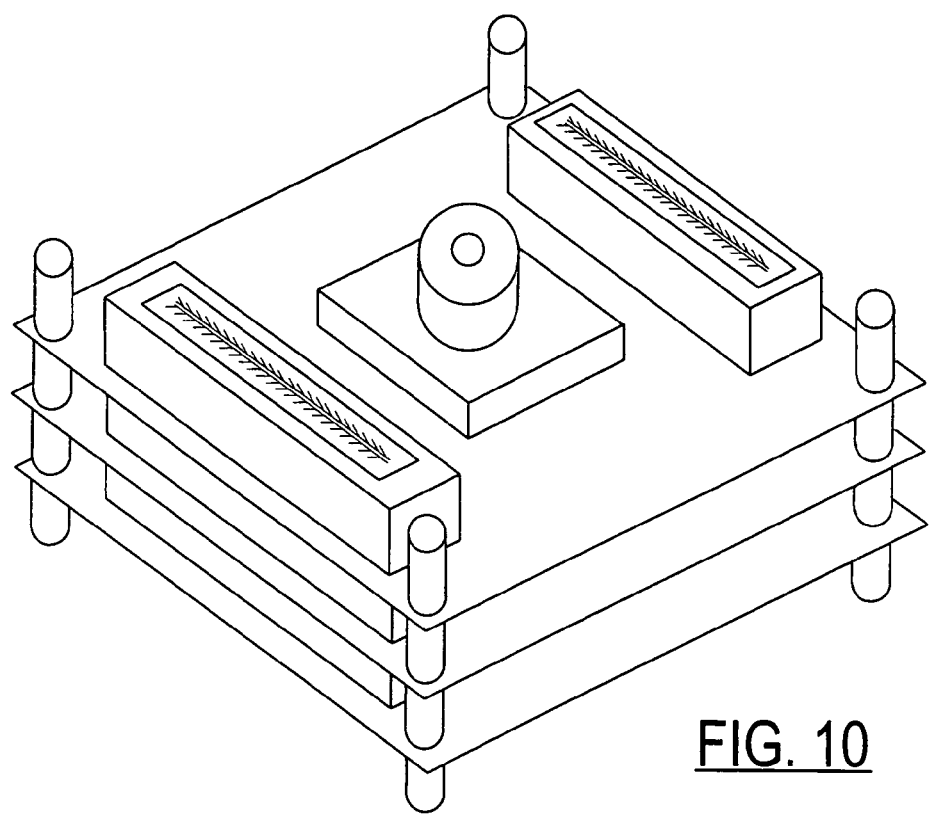
FIG. 10 is a simplified perspective view of a presently preferred arrangement of printed circuit boards (PCBs), called a multi-processor stack, wherein each of the PCBs preferably contains at least one FPGA, and also may typically have associated therewith driver circuits, input/output circuits, power circuits and the like in order to ensure proper operation of the FPGA, and also has in-line connectors represented by the elongated blocks for interconnecting the PCBs together, and for receiving to input/output signals at the top and bottom of the stack, and also showing, on the top PCB, an image sensor and a miniature focusing lens in the center of the top board.
Figure 12:
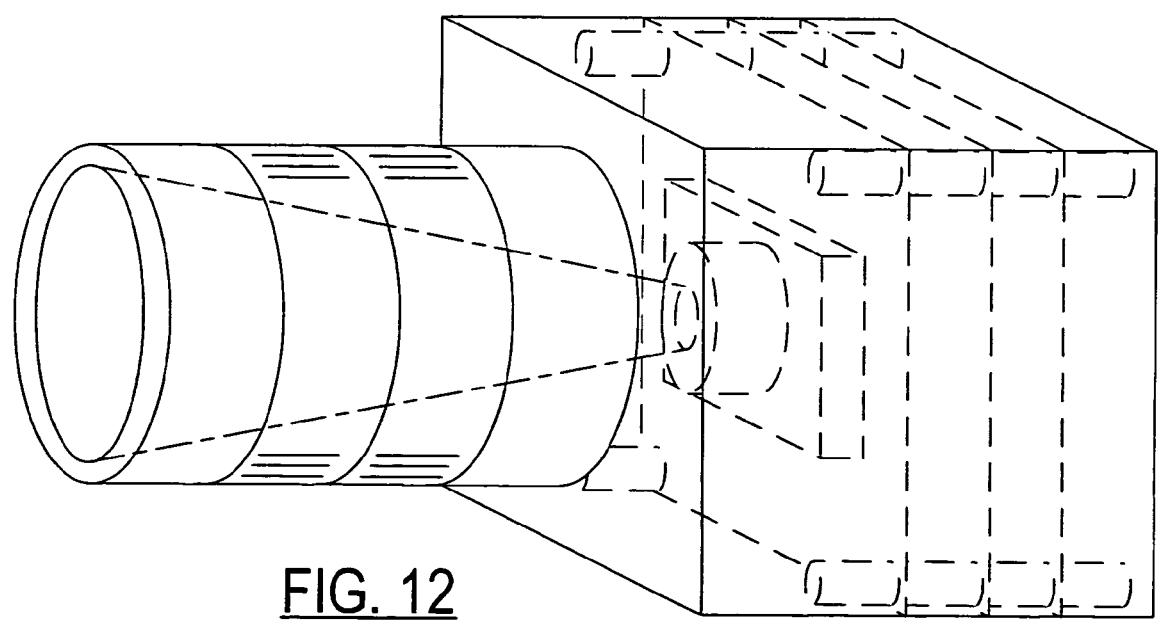
FIG. 12 is a simplified perspective view of a digital camera with its generally rectangular enclosure, having an external lens on its left surface, which external lens is used to project a visual image onto the image sensor located on the top PCB of the FIG. 10 stack shown located within the camera enclosure.

The PVI processing stack is the target architecture. A given board within the stack is called the target board if it contains an FPGA to be programmed. In general, the PVI stack architecture is specifically designed to support real-time embedded image processing. The basic hardware structure employs Xilinx field-programmable gate array (FPGA) processors in a compact stand alone format as shown in FIGS. 10 and 12.

Using FPGAs as the processing engine allows extremely high performing image processing systems to be defined and inexpensively fielded. A single stack processor can outperform a dozen or even 100 PCs by performing thousands of individual operations simultaneously.

Each stack processor consists of an FPGA, local RAM, daughter card connectors, and local interconnect to adjacent cards in the stack. The cards are designed to stack vertically for expansion. The base of the stack contains a microcontroller which provides power-up programming services for the stackable processors.

The daughter card interfaces allows specialized I/O to be added to a stack processor. An embedded image processing system will typically have at least one sensor input, such as a CCD camera, as well as some type of external output.

The processing stack is designed to support embedded image processor applications suitable for handling a variety of image processing needs. The stack and its communications channels lend themselves to supporting a variety of image processing architectural models. The PVI system of the present invention automatically generates a bit stream which implements a user's image processing algorithm. While the present invention will be described with respect to a pipeline architecture, those skilled in the art should appreciate that the present invention may be adapted to implement other types of architectures as well. In this regard, it is useful to describe some of the benefits of different types of architecture.

Pipeline architecture is efficient in terms of hardware/CLB resources at the expense of latency. For many image processing applications, this approach is entirely suitable, especially since it is capable of continuous-rate processing.

Pyramid architectures suit several general algorithm models, including coarse-to-fine resolution and focus-of-attention style processing. Pyramids are synergistic with pipeline processors because they allow higher frame rates at lower hardware costs. In general, the PVI compiler of the present invention assumes that one pyramid level will be implemented per stack layer.

The 2D array architecture may also be implemented. In the PVI compiler of the present invention, there will be one or more CLB per image pixel used. The 2D array architecture is suitable for relatively small (32×32 or less) images only, given the CLB array sizes of the underlying FPGAs from Xilinx.

Figure 11:
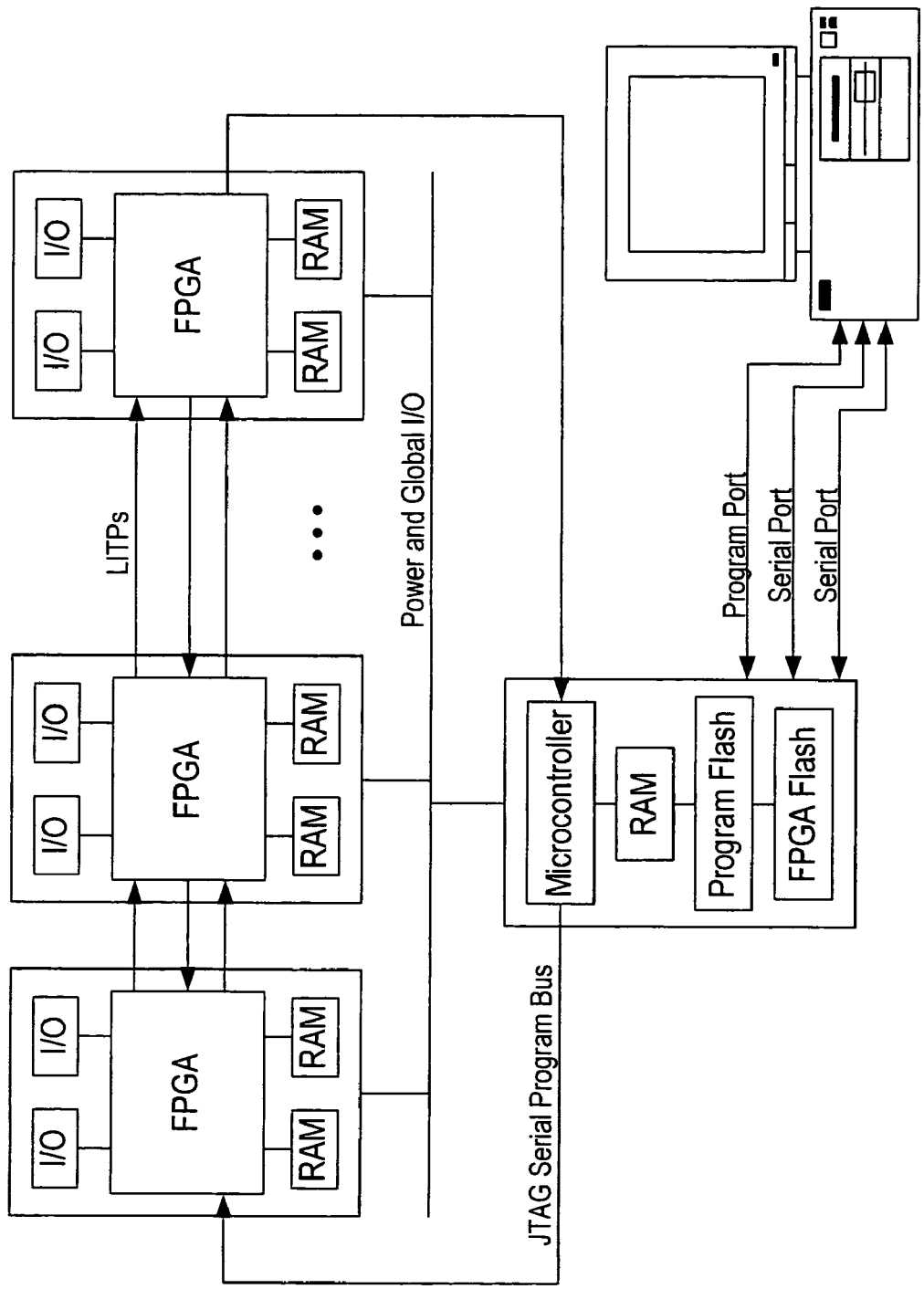
FIG. 11 is a block diagram showing the interrelationship and wiring connections between the four PCBs in the stack of FIG. 10, which illustrates the signal flow paths between the individual PCBs and also illustrates a workstation being connected to the microcontroller PCB, which workstation passes the bitstream from the low level programming tool located on the workstation to the FPGA/program flash/RAM microcontroller, which thereafter handles the loading of the bitstream after power up to the individual FPGAs.
Figure 13:
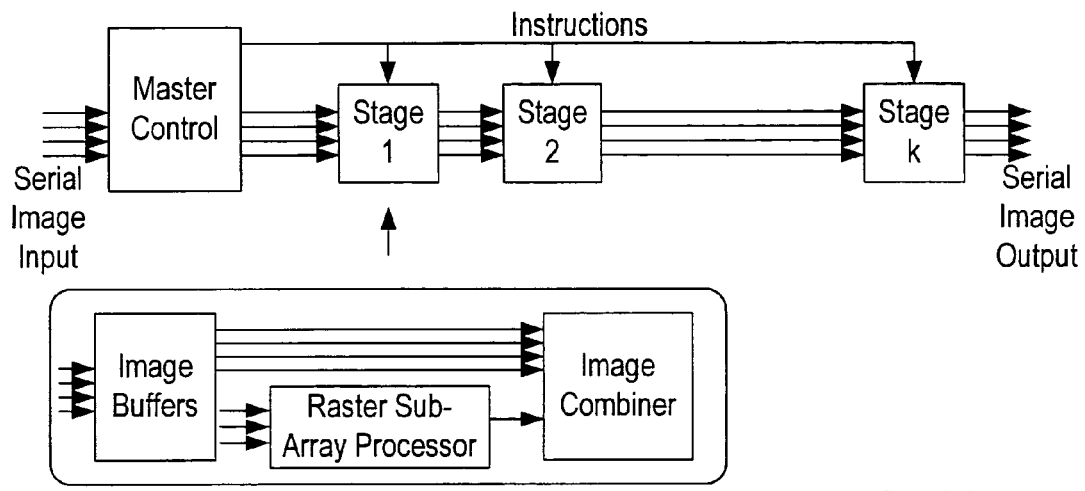
FIG. 13 is a simplified block diagram of a first possible target architecture for the system of the present invention, namely a multi-pipeline raster sub-array.
Figure 15:
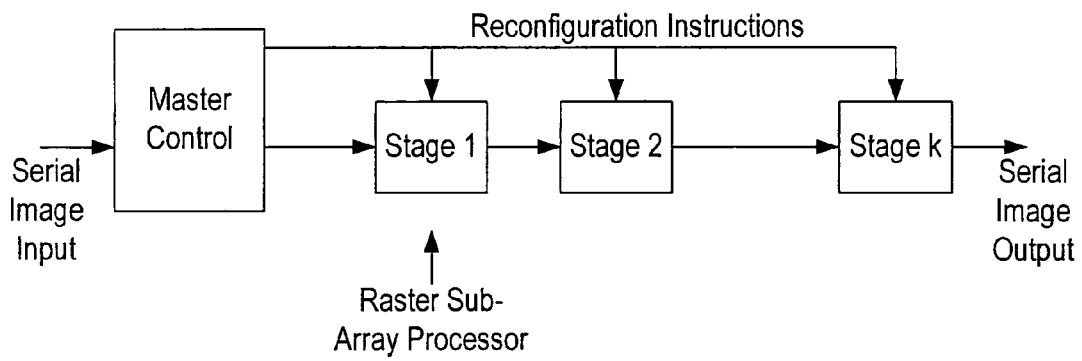
FIG. 15 is a simplified block diagram of a third possible target architecture for the system of the present invention, namely a pipeline raster sub-array processor.
Figure 14:
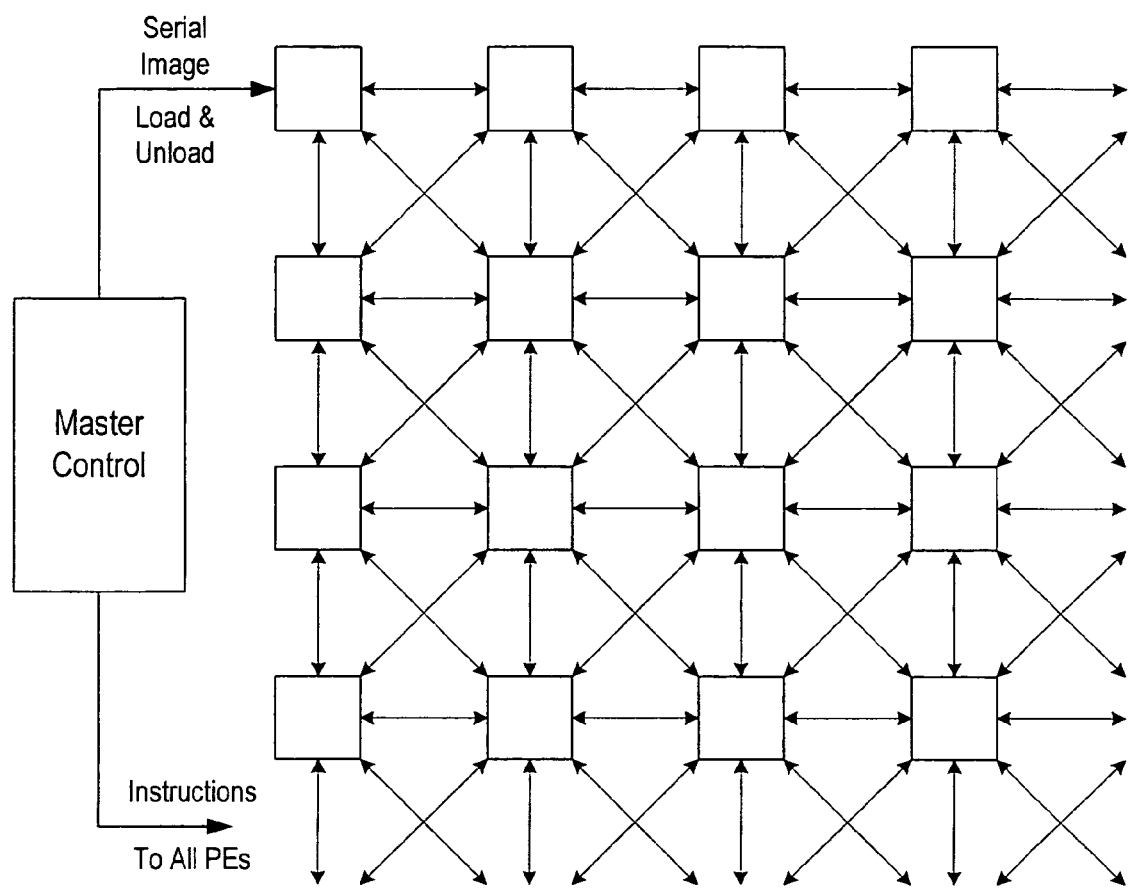
FIG. 14 is a simplified block diagram of a second possible target architecture for the system of the present invention, namely a parallel array processor.
Figure 16:
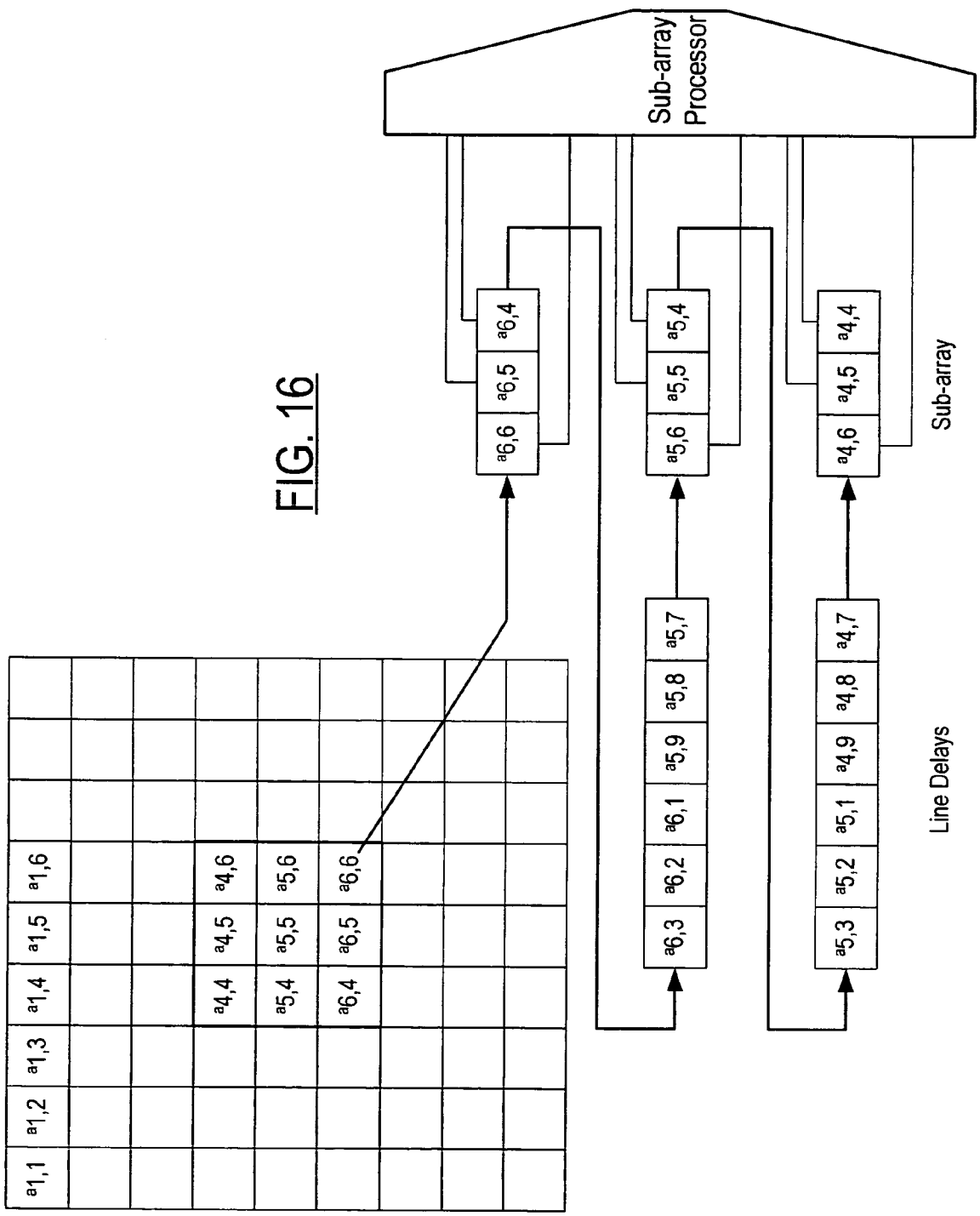
FIG. 16 is a more detailed diagram showing some of the details of the FIG. 15 target architecture.
Figure 17:
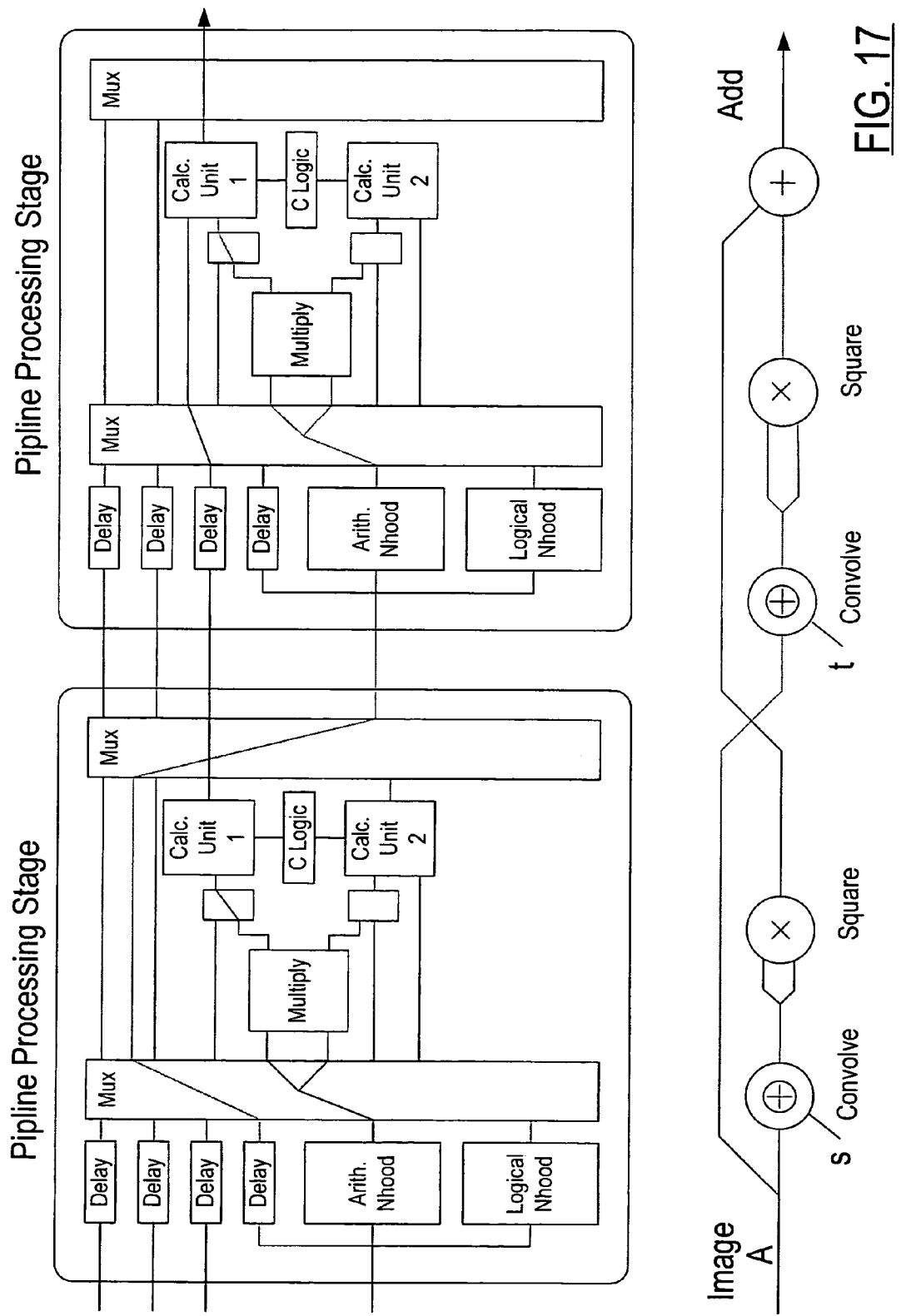
FIG. 17 illustrates on the bottom half thereof a Sobel operation dataflow produced by the analyzer module of the system of the present invention, and on the top half thereof illustrates the mapping of that Sobel operation dataflow onto a multi-pipeline sub-array processor.
Figure 18:
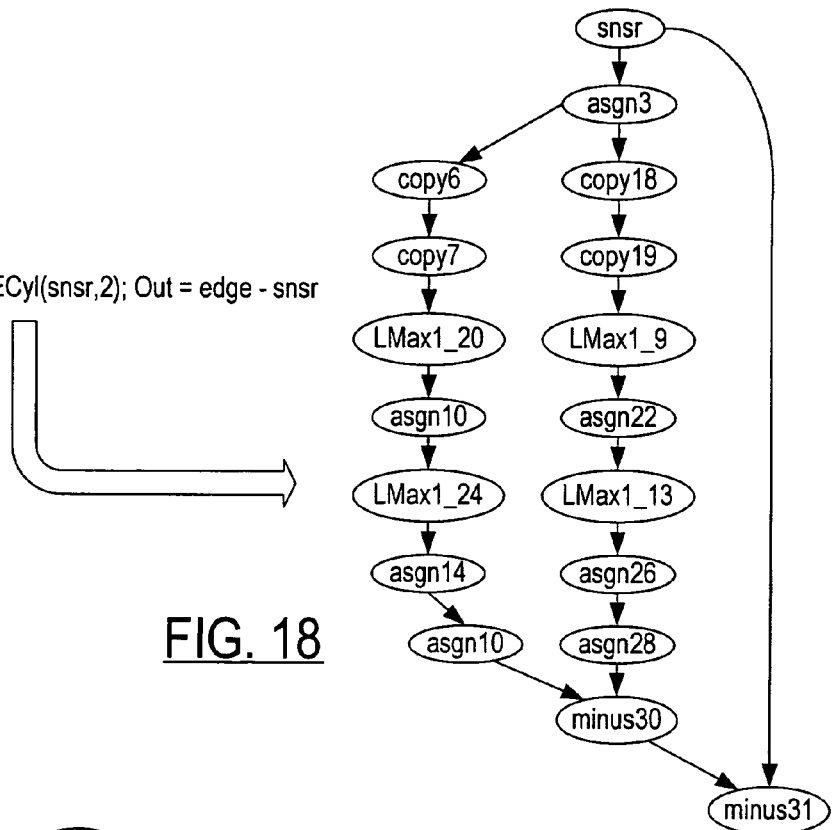
FIG. 18 is an illustration of high-level source code, defined by an end user, and its translation into an associated operation dataflow diagram.
Figure 19:
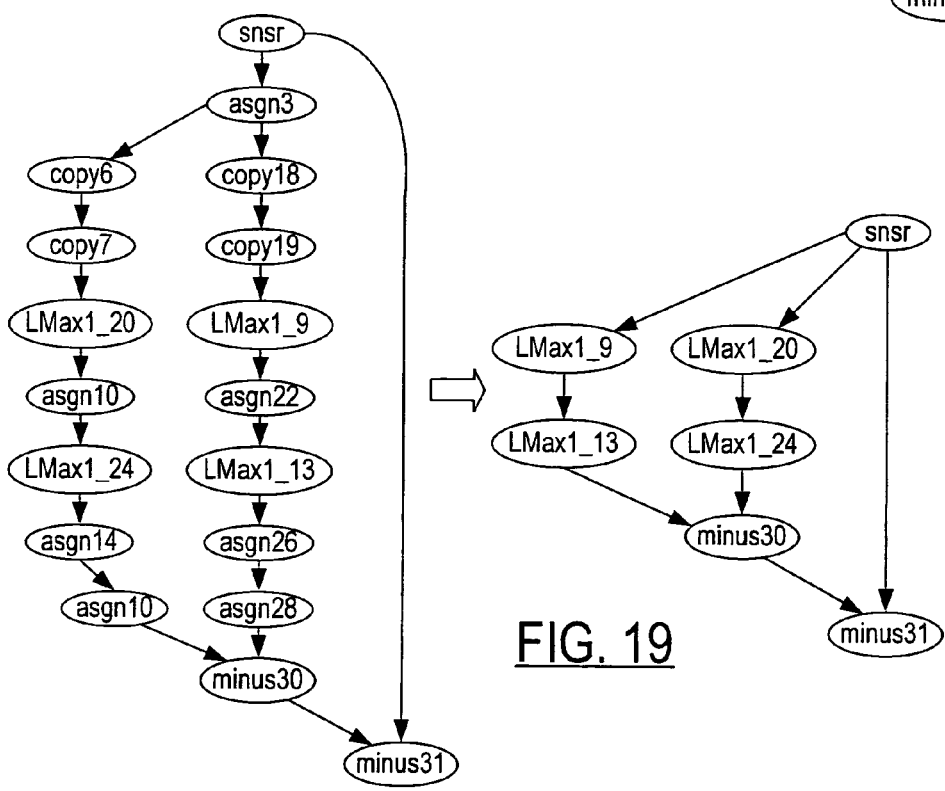
FIG. 19 is an illustration of the simplification of the FIG. 18 operation dataflow diagram by the removal of unnecessary operations.
Figure 20:
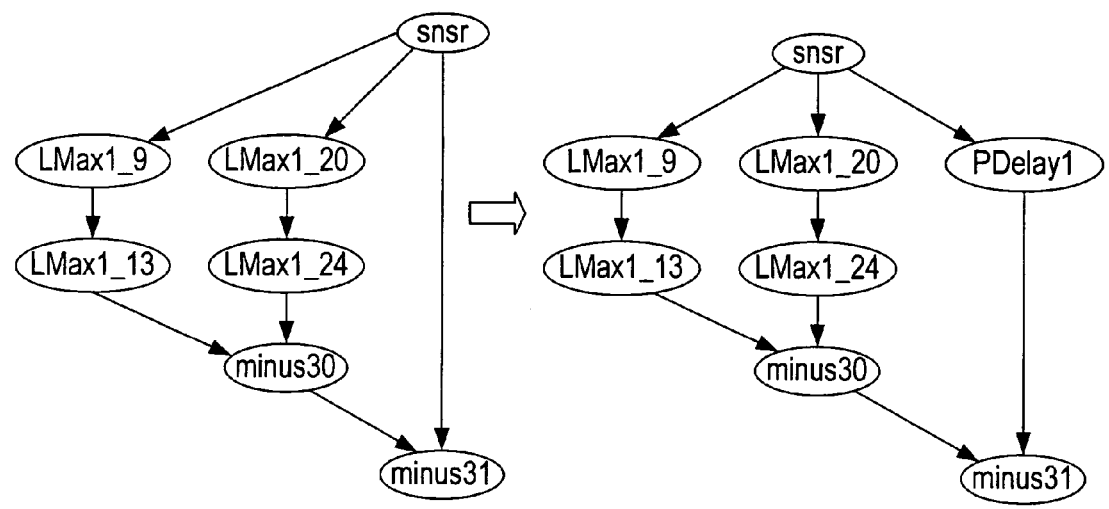
FIG. 20 is an illustration of pipeline compensation being added to the resulting product in FIG. 19 in order to equalize the timing between alternate data paths.
Figure 21:
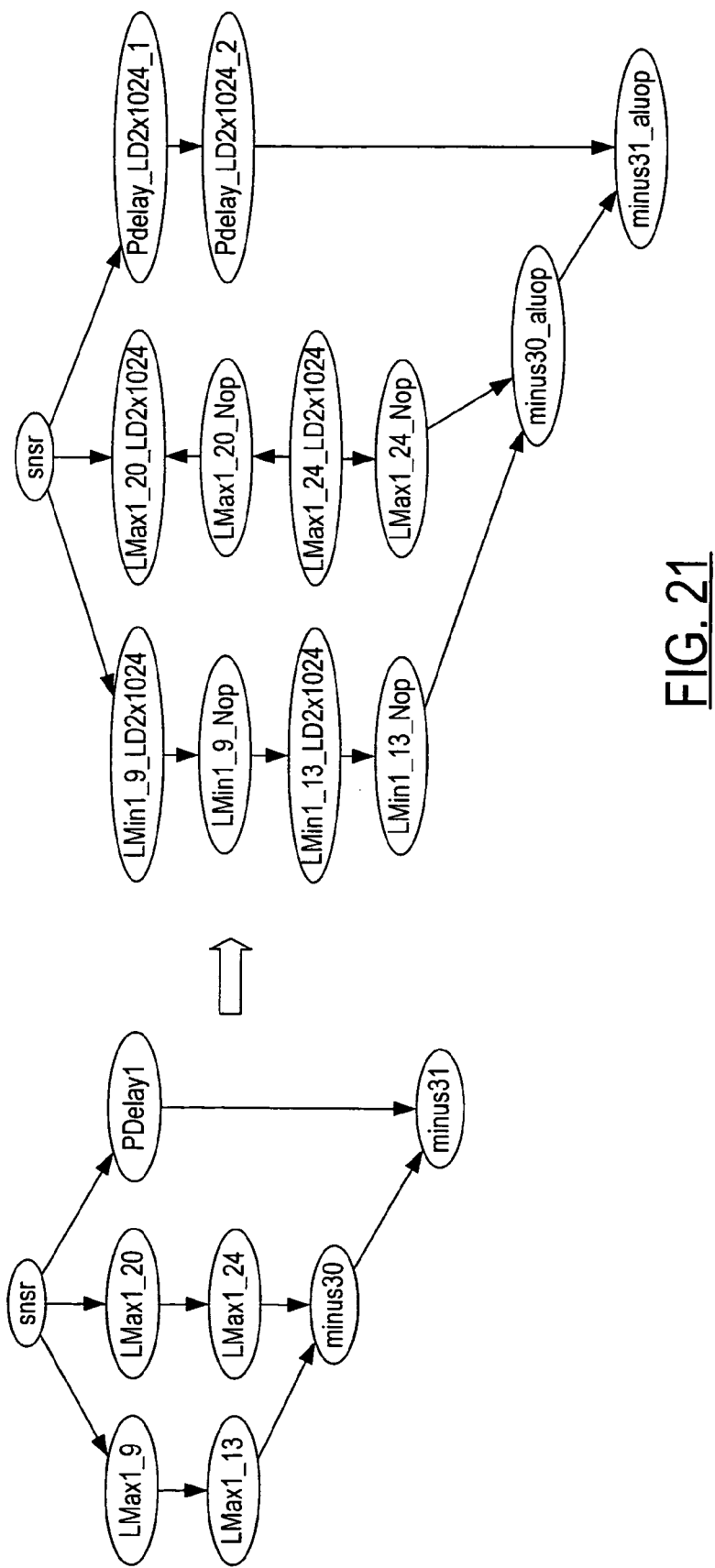
FIG. 21 is an illustration of operator elaboration modifying the graph when the operator is built from more than one primitive component, as would be carried out by the mapper when presented with a image processing sequence of the type shown on the left side of FIG. 21.

As previously noted, the PVI processing stack at a minimum currently consists of four cards: one stack base, one stack processor and two daughter cards. Each will now be described. The stack processor is based upon, that is, built around, the Xilinx FPGAs. (See FIG. 10). It includes two 16 MB RAMs, two daughter-card I/O interfaces and four high-speed LVDS point-point links with two stack processors above/or below. A shared 8-bit interface to the stack base, and a shared RS-32 serial interface are also provided. A block diagram is given in FIG. 11.

Epilogue. The systems and methods of the present invention need not be further described here since those skilled in the art, based on the teachings of the present invention, will readily understand how to implement the same. This in part is due to the widespread use of conventional FPGA field programming software and design tools written to make manageable the tasks of designing algorithms in a relatively high-level language like C++ or Java, and then taking that code and turning it into bitstream code for actual programming of the FPGAs. Although the foregoing disclosure of the present invention has focused primarily upon the Xilinx FPGAs and its ISE programming environment as exemplary embodiments, any suitable FPGA manufacturer, including but not limited to Altera, and any suitable FPGA programming approaches and/or other well-known protocols and tools familiar to those writing FPGA programs and/or components, may be used. These include object-oriented programming languages, such as but not limited to Java, to implement the systems and methods of the present invention. Also, the systems and processes of the present invention may be written as programs or a set of interrelated routines in any suitable programming language, such as but not limited to C++ or an object-oriented language, and then deployed to run under the control of any suitable management software package including any operating system as desired.

While this example is a simple one for demonstration purposes, it makes use of the features of the present invention. Obviously, more complex circuits may be built using the same basic principles of the present invention; the primary difference is in the size of the code.

PVI design system and methods provides a simple-to-use, fast, integrated system for designing and developing the logic required to code an FPGA, whether it is write-once or is reconfigurable (i.e., an FPGA). The approach of the present invention provides very fast compilation times compared to the old much-more manual style of design. The compile times necessary to produce these circuits and run-time support code is on the order of seconds, many orders of magnitude faster than the design cycle time of traditional FPGA design tools. This unusual speed permits development in an environment that is similar to a modern integrated software development environment. Additionally, the object-oriented nature of this approach, in terms of implementations for the basic building blocks, permits libraries of known tried and tested functions to be built, including parameterized cells. As more image processing functions are added to the core library of functions available for use, this should result in the expanding use of the methods and systems of the present invention.

The above text describes the present invention in the context of FPGAs used for-reconfigurable computing, such as any member of the Virtex II family of FPGAs from Xilinx, Inc. However, the invention can also be applied to other FPGAs and gate arrays that are write-once rather than being reprogrammable. For those "write-once" gate arrays, testing can be done via a good FPGA simulation system prior to committing to burning the connections into the array. However, testing is not necessary once the developer has verified the algorithm in C++.

The present invention has been described in part by reference to block and flow diagrams and elements of components, systems and steps of methods. As is well known, suitable program instructions provided in software are used to turn general purpose computers and/or processors into programmed computers and/or processors to form systems capable of carrying out the teachings of the present invention.

It should be appreciated by those skilled in the art that if desired, the systems, methods and software described herein may be implemented in part in firmware (including microcode) or hardware. Accordingly, the present invention may take the form of an embodiment including hardware and/or firmware, or an embodiment that is a combination of software, hardware and/or firmware. Further, the methods of the present invention may be carried out entirely in software, or in a combination of the software, hardware and/or firmware.

Also, the software employed to implement the present invention may be provided in any suitable form of computer program code embodied in tangible media, such as but not limited to floppy diskettes, CD-ROMs, hard drives, or any other computer readable storage medium. When such the computer program code, containing the needed instructions, is loaded into and is ready for execution by suitable computers/processors, such programmed computers/processors become an apparatus for practicing the invention. Thus, it should be appreciated that another embodiment of the present invention is the computer program code needed for carrying out the processes of the present invention when it is embodied in a tangible medium.

The foregoing detailed description shows that the exemplary embodiments of the present invention are well suited to fulfill the purposes above-stated. It is recognized that those skilled in the art may make various modifications or additions to the embodiments chosen to illustrate the present invention without departing from the spirit and proper scope of the invention. Accordingly, it is to be understood that the protection sought and to be afforded hereby should be deemed to extend to the subject matter defined by the appended claims, including all fair equivalents thereof.

What is claimed is:

1. A method for programming a field programmable gate array (FPGA) comprising the following steps:
    accepting a user-defined algorithm specified in a source code of a high level language and designed to process data vectors with one, two, or more dimensions;
    analyzing the user-defined algorithm, including identifying the vector processing operations of the source code;
    mapping the vector processing operations onto logic components of an FPGA; and
    programming the FPGA with the user-defined algorithm based on the mapping of the logic components.

2. The method of claim 1, wherein the accepting of the user-defined algorithm includes accepting a user-defined algorithm specified in a high level language that is operable to specify vectors at the source code level through object types.

3. The method of claim 2, wherein the accepting of the user-defined algorithm includes accepting a user-defined algorithm specified in C++.

4. The method of claim 1, wherein the identifying of the vector processing operations includes parsing the source code.

5. The method of claim 4, wherein the analyzing of the user-defined algorithm includes determining the relative timing between the vector processing operations.

6. The method of claim 5, wherein the analyzing of the user-defined algorithm includes providing an operation dataflow graph that indicates the overall flow of vector processing results between vector operations.

7. The method of claim 1, wherein the analyzing of the user-defined algorithm includes identifying the type of operators and the vector input operands of the vector operations.

8. The method of claim 7, wherein the analyzing of the user-defined algorithm includes identifying the orders and dependencies of the vector operations.

9. The method of claim 1, further comprising: providing a library of predefined functions, including first group of image processing functions, a second group of arithmetic functions, and third group of Boolean functions.

10. The method of claim 9, further comprising: determining a first rule set that represents constraints associated with the FPGA and with at least some of the predefined functions in the library, wherein the analyzing of the user-defined algorithm includes accessing the first rule set.

11. The method of claim 10, further comprising: determining a second rule set that represents constraints associated with the FPGA and with at least some of the predefined functions in the library, wherein the mapping of the logic components includes accessing the second rule set.

12. The method of claim 1, wherein the mapping of the vector processing operators onto FPGA logic components includes evaluating alternative component placement and interconnection routes between the logic components.

13. The method of claim 12, wherein the mapping of the vector processing operators onto FPGA logic components includes producing an optimized placement and interconnection routing of the logic components on the FPGA, based on the evaluation of alternative placement and interconnection routes.

14. The method of claim 13, wherein the mapping of the vector processing operators includes producing a generally serpentine vector flow path on the FPGA.

15. The method of claim 14, wherein the mapping of the vector processing operators includes instantiating substantially only logic components called out by the source code.

16. The method of claim 1, further comprising accepting a user selection for an architecture for the FPGA.

17. The method of claim 16, wherein the accepting of the user selection for an architecture for the FPGA includes accepting a user selection from the group including a parallel array processor, a raster sub-array processor, a pipeline raster sub-array processor, and a multi-pipeline raster sub-array processor.

18. The method of claim 1, wherein the programming of the FPGA includes generating a low level logic description and logic component placement listing.

19. The method of claim 18, wherein generating a low level logic description and logic component placement listing includes generating an input file for a low level conventional FPGA programming tool.

20. The method of claim 1, wherein the programming of the FPGA includes generating a hardware gate programming bitstream to be directed to the FPGA.

* * * * *